United States Patent Office 3,397,265
Patented Aug. 13, 1968

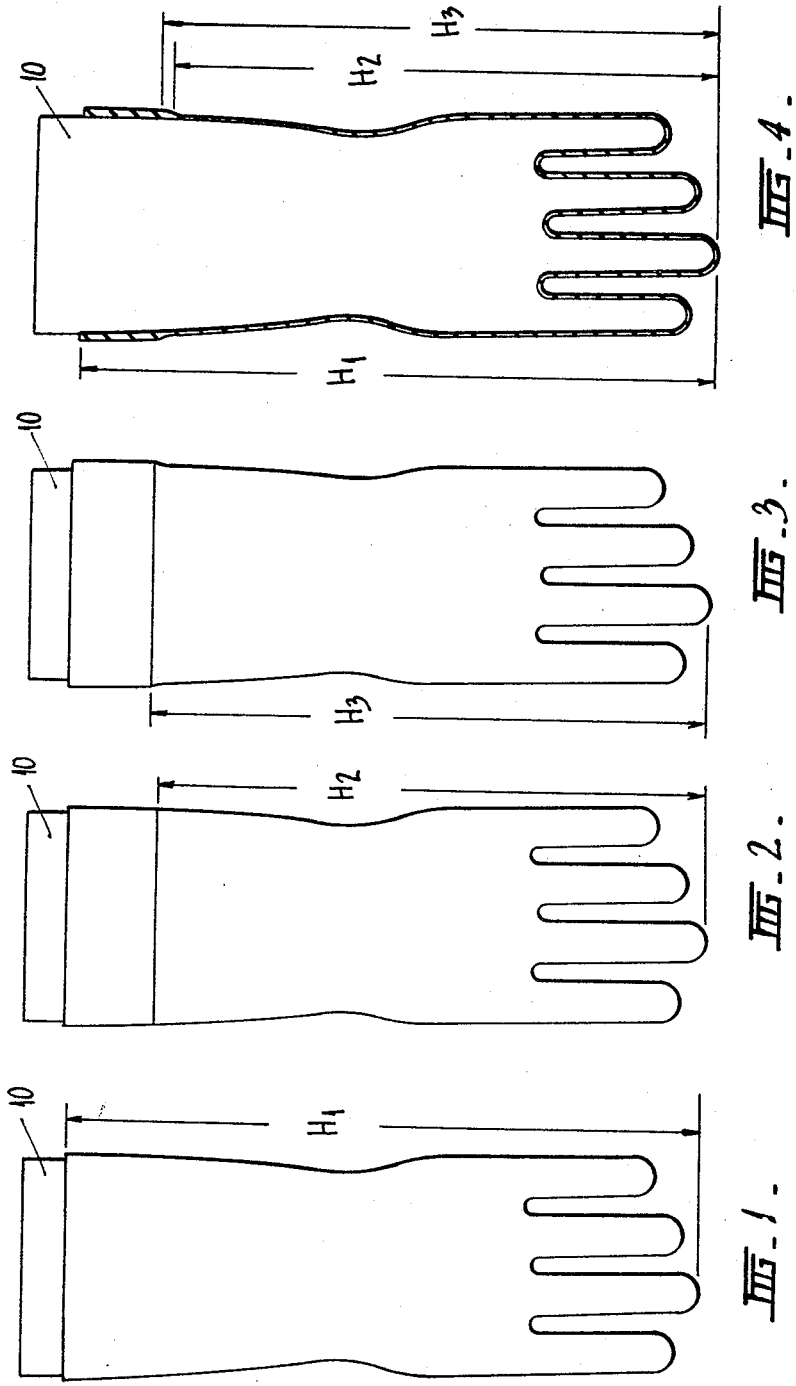

3,397,265
METHOD OF THE MANUFACTURE OF THIN-WALLED ARTICLES OF RUBBER OR THE LIKE
Harvey Neil Ansell, Olinda, Victoria, Australia, assignor to Rubber Products Development Proprietary Limited, Richmond, Victoria, Australia, a company of Australia
Continuation-in-part of application Ser. No. 392,858, Aug. 28, 1964. This application June 9, 1967, Ser. No. 657,448
1 Claim. (Cl. 264—306)

ABSTRACT OF THE DISCLOSURE

A method of continuously moulding rubber gloves by immersing a series of formers, each having the shape of a glove, into a bath of concentrated coagulant to a depth of the length of the glove to be formed. Removing the formers from said bath and then immersing them in a solvent of the coagulant to remove substantially all the coagulant below the wrist portion of the glove to be formed. Transferring the formers to a bath of dilute coagulant and immersing them to about the same depth as the coagulant removing step. The formers are then removed from the bath and late is applied to their coagulant-coated areas to provide a glove having relatively thin-walled hand sections and a thick wrist band.

This application is a continuation-in-part of Ser. No. 392,858, filed Aug. 28, 1964, and now abandoned.

This invention relates to the manufacture of thin-walled articles of rubber (which term as used herein includes other rubber-like substances) and provides a method and apparatus whereby the thickness of the rubber may be controlled at required areas of the article. A specific application of the invention is in the manufacture of surgical gloves, but it is not restricted thereto since it may be applied to the manufacture of any thin-walled rubber article the wall thickness of which requires to be controlled at specific areas.

Surgical gloves are made as thin as is practicable because of the need to preserve sensitivity for the wearer, and usually have a wall thickness approximating .010" at the cuff and .012" at the fingers. Such gloves are usually made on hand shaped formers which are dipped with the fingers lowermost into a bath of a suitable liquid latex and are then withdrawn with a thin latex coating thereon. As the finger portion of the former enters the latex first and leaves it last the fingers receive the longest immersion and consequently are the thickest parts of the gloves, being usually about .002" thicker than the cuff or wrist portions. This is not desirable, as the fingers and body part should be thinner for sensitivity and the cuff thicker for strength in putting on and for gripping the gown.

Because of this thinness at the cuff it has been usual to provide a beaded or other reinforced edge to prevent tearing when placing on the hands as well as to provide a firmer edge which will help to grip over the cuffs of the wearer's gown. This beaded edge is formed by rolling the rubber up upon itself at a suitable stage of manufacture (but usually before final drying and vulcanising) until a rounded bead is formed at the edge of the glove. This bead usually has a diameter of from .030" to .075" according to individual manufacturer's requirements.

The bead is formed by either hand operation or mechanical means. If formed mechanically it is required to rotate each individual former, at the same time applying an upwards pressure against the edge of the rubber by means of a roller, or cylindrical shaped brush. If formed by hand each individual former must be made accessible to the operator forming the beads at a suitable stage of manufacture. In either case it is a distinct and separate operation performed in the manufacture of such gloves.

Surgical gowns usually have long sleeves which are worn to the wrist and over which the cuffs of the gloves are drawn. The dimensions of the gown-enclosed wrist are usually sufficient to hold the cuff portion of the gloves under a moderate stretch or tension. It is desirable that such tension shall keep the cuffs of the gloves stretched and in place over the gown as both gloves and gowns are rendered sterile prior to the commencement of surgery and it is important that both such sterile coverings do not "part company" and thus expose a possible unsterile area.

It is known that the rolled edge has a disadvantage in use. When worn over the gown and under tension, such tension has a tendency to cause the beaded edge to roll downwards upon the cuff of the gloves, particularly if accidentally rubbed against the side of the gown or other object. Such rolling action, once commenced, frequently continues until the cuffs of the gloves roll off the cuffs of the gown.

In the manufacture of surgical gloves labor-saving machinery has become very important. Recently, disposable gloves have been introduced and the practice of re-using gloves is being increasingly discontinued. It therefore becomes of utmost importance that such gloves are available at the lowest possible cost.

The need to apply a beaded edge to surgical gloves has affected machinery design to the extent that the formers must be made accessible for the forming of the beads. This means that the formers are usually arranged along the edge of a conveyor (usually a belt or chain) at spaced intervals and pass one behind the other continuously through the entire length of the machine. As they pass any given point singly they can conveniently be beaded during their passage either mechanically or by hand. This method, since the formers are mounted along a conveyor, requires machinery of quite extensive length. A practical mounting of formers along a conveyor would approximate two pairs per foot through the machine length whereas the method herein described makes possible twenty-four pairs per foot or more if desired with a proportionate decrease in machine size.

If the formers are dipped in close formation on racks, it is necessary that these racks be "broken up" so that each individual former is accessible for the beading operation, thus necessitating a break in continuous production and limiting the size of battens or racks bearing the formers which have to be removed for beading and then replaced in the machine for continuation of the process of manufacture.

The normal method of manufacture of surgical rubber gloves comprises the following basic steps.

The formers or moulds on which the articles are made and which impart the final shape and configuration to the gloves are usually (but not always) made of porcelain. Such formers are firstly dipped into a liquid coagulant, dried and secondly dipped into a suitably compounded liquid latex, either of natural or synthetic or a combination of both. The coagulant firstly placed on the formers causes the latex to deposit on the formers to the desired thickness, such thickness being in the main controlled by the amount of the coagulant deposited on the formers and the period of time the formers are allowed to dwell in the latex. Other factors can influence the thickness of the deposit to a minor degree but the two mentioned are the main ones and are sufficient for this description. Thirdly the formers are removed from the latex, allowed to partly dry or gel then leached in water for a period of time. Fourthly after a short drying time they have their edges rolled to form the beads heretobefore mentioned. Fifthly final drying and vulcanization takes place and the gloves are then removed from the formers for final testing and packing. The above described method is a simple and basic description of the principle of manufacture and does not attempt to be full and complete.

One of the objects of this invention is to provide a method of making surgical rubber gloves having an unbeaded cuff sufficiently thick to prevent rolling and strong enough to prevent tearing when being placed on the hands, and having fingers and body sufficiently thin to allow the necessary sensitivity.

It has previously been proposed to produce surgical gloves of this kind by a method according to which the formers with the fingertips down are firstly immersed in a bath of coagulant in the usual way. After the formers are withdrawn they are inverted and after the coagulant coating has partially or wholly dried they are immersed with the fingertips up, into a bath of latex. The formers are removed from the latex bath and carried through washing, drying and curing processes. As in this method, because they enter the latex first and leave last, the wrist portions of the formers are immersed for a longer time than the finger portions the resulting gloves taper in thickness from a maximum at the wrist to a minimum at the fingertip.

This known method of producing gloves having a thickened cuff is however subject to the disadvantage that the apparatus is more complex in design and thus limits mechanization, while also the base part of the formers as well as portion of the apparatus upon which the formers are mounted, are immersed in the latex bath and receive a coating of rubber. The gloves, before they can be stripped from the formers, need to be severed from this film of rubber coating the base of the formers and the holding apparatus, and which must afterwards be removed therefrom and become waste rubber.

The use of the method and apparatus of the present invention permits the use of compact machinery for automatic production. With this method formers can be racked in close formation and held thus for the entire manufacturing process.

This allows machines having large output to be compact, requiring a minimum of floor space and lower capital cost.

The primary object of the present invention is to provide a new and improved method of moulding a thin-walled rubber article with wall sections of different thicknesses.

A further object of the invention is to provide a new and improved method of the manufacture of rubber gloves whereby the thickness of the finger and body parts and the cuffs may be varied as desired independently of each other.

A further object of the invention is to provide a new and improved method of the manufacture of rubber gloves wherein the gloves have cuffs sufficiently thick so that a beaded edge is not necessary to prevent tearing and wherein the cuffs supply a firm grip over the cuff of a surgeon's gown.

A further object of the invention is to provide a new and improved method of the manufacture of rubber gloves wherein the gloves have a beadless thickened cuff and are made without waste rubber.

A further object of the invention is to provide a new and improved method of the manufacture of rubber gloves whereby there are provided gloves having no beaded edge and therefore no tendency to roll down when in use.

A still further object of the invention is to provide a new and improved method of the manufacture of rubber gloves wherein the method makes possible the manufacture of beadless gloves and thereby permits the design of economical and compact apparatus having a large output and being adaptable to automation.

In order that the view may be more readily understood it will now be described by way of example with reference to the accompanying drawings, which illustrate the application of the invention to the manufacture of surgical gloves having thickened wrist bands.

In the accompanying drawings:

FIGURE 1 illustrates a former after the first stage of the method of the invention;

FIGURE 2 illustrates the same former after the second stage of the method;

FIGURE 3 illustrates the former after the third stage of the method;

FIGURE 4 is a cross-sectional view of a glove on the former; and

Figure 5:
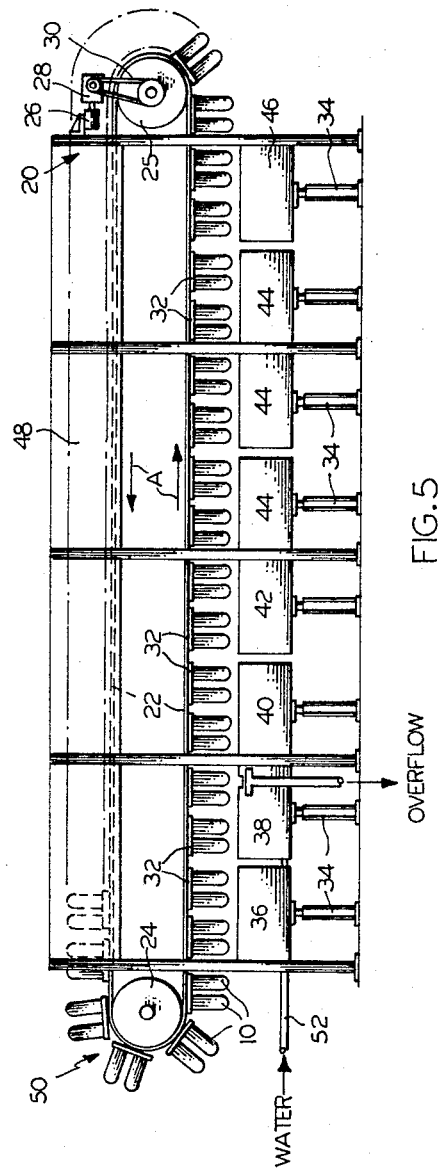
FIGURE 5 is a diagrammatic illustration of one form of apparatus in accordance with the invention.

The method of the invention is as follows:

In the first stage a former 10 is dipped into a concentrated coagulant, e.g. a solution of 50% calcium nitrate concentration by weight, to a depth $H_1$ equal to the required overall length of a glove. After withdrawal from the bath the coagulant retained on the former 10 is allowed to partially or fully dry.

In the second stage the former is immersed in a further bath of solvent for the coagulant, preferably water, to a depth $H_2$ less than the previous depth of immersion in the concentrated coagulant bath. The difference between the depths $H_1$ and $H_2$ is approximately equal to the predetermined width of the thickened cuff or wrist band of the glove. This immersion removes substantially all of the concentrated coagulant from the former up to the point of immersion in the water and is carried out so that after the former is removed from the water and subsequently dried a band of concentrated coagulant is left on the former at its cuff or wrist portion, and little or no coagulant on the other portions. The coagulant thus removed during this immersion in water is wasted inasmuch as the water is constantly replenished so as to keep the concentration of coagulant therein substantially constant and at a low value, but as the coagulant is very cheap it has little bearing on costs. The wrist portion of the former 10, previously coated with concentrated coagulant, is not immersed in the water during the second stage.

In the third stage the former 10 is dipped into a dilute coagulant, e.g. a solution of 12½% calcium nitrate concentration by weight, to a depth $H_3$ which is slightly greater than $H_2$ so that the dilute coagulant meets and over dips the lower edge of the concentrated coagulant left on the former after the second stage by approximately ⅛". The former is withdrawn in allowed to dry and now has its surface coated with two coagulants, the first stage concentrated coagulant at the wrist portion and the dilute third stage coagulant on the rest of the former.

In the fourth stage the former is dipped into suitable compounded latex and allowed to dwell. The concentrated coagulant at the wrist portion causes a considerably thicker film of latex to deposit, than the portion coated with the dilute coagulant. This dilute coagulant is sufficient to deposit a film of latex thick enough to produce gloves of the required thickness on the body and finger parts. The finished glove is illustrated in FIGURE 4 and it will be observed that the dipping of the former 10 in the third stage to a depth where the dilute coagulant overlaps the concentrated coagulant, besides ensuring that there will be no uncoated areas on the former, results in a tapered junction between the thicker and thinner portions of the glove.

The usual steps of partial dry or gel, leaching, drying, vulcanizing, stripping, etc., follow. Thus produced are gloves of suitable thickness on their finger and body parts but having a thickened band at the wrist where the strong coagulant had been placed. The thickness of the body and finger parts can be varied at will and is not related to or affected by the thickness of the cuffs (which similarly can be varied) as herebefore.

It will be appreciated that the solution strengths of the respective coagulants may vary over a very wide range, depending partly on the thickness of rubber which it is desired to deposit, and partly on the characteristics of the latex solution. Therefore the only restriction to be placed on the meaning of the terms "concentrated" and "dilute" as used herein is that the concentrated coagulant is of greater strength than the dilute coagulant. In addition coagulants other than calcium nitrate are known and used in the industry and may be used in carrying out the process of the present invention. For example, calcium chloride may be used instead of or in conjunction with calcium nitrate.

The advantages of the method of this invention are that very superior gloves can be produced quickly and economically as the entire operation may be performed automatically. It is a simple matter to produce gloves having a cuff of almost any thickness up to .20" with fingers down to .006" although gloves having a cuff thickness of .015" and fingers of .008" to .009" would be considered generally suitable.

A suitable apparatus for performing the method of the invention is illustrated diagrammatically in FIGURE 5. The apparatus includes a frame 20 on which is mounted an endless conveyor 22, the conveyor preferably being a chain conveyor supported on sprockets 24, 25 mounted at each end of the frame 20. The sprocket 25 at one end of the frame is driven by means of an electric motor 26 through a gear unit 28 and a sprocket drive 30. Racks 32 are attached to the conveyor 22 at closely spaced intervals and each rack has mounted on it a plurality of formers 10.

Below the conveyor are mounted, on respective lifting devices 34, a concentrated coagulant tank 36, a concentrated coagulant wash tank 38, a dilute coagulant tank 40, a latex tank 42, a plurality of leaching tanks 44 and a powder coating tank 46. The depth of liquid in each of the tanks 36, 38, 40 and 42, and therefore the depth of immersion of the formers, is carefully controlled to a predetermined level by an overflow or other suitable means. Alternatively, or additionally, each of the lifting devices associated with these tanks may be calibrated to raise its respective tank to a predetermined height to provide the correct depth of immersion of the formers in the liquid in accordance with the method hereinabove described. In addition the wash tank 38 has a water or other dilute feed line 52 and the overflow therefor is shown at 54, the overflow opening into a drain line 56. Liquid is fed through line 52 to keep the concentration of the coagulant in the wash tank substantially constant and at a low value.

The conveyor 22 is moved by the drive mechanism with an intermittent motion in the direction of the arrows A, the length of each stepwise movement being equal to the pitch of the tanks mounted beneath the conveyor. At the conclusion of each stepwise movement the tanks are raised by their lifting devices to the predetermined height to provide the correct depth of immersion of the formers in the respective tanks. After each former has passed through the operations of concentrated coagulant coating, concentrated coagulant washing, dilute coagulant coating, latex coating, leaching and powder coating, it passes to a drying and vulcanizing oven 48 and from there to a stripping station 50 where the completed gloves are removed from the formers. The formers are then ready to be used for the manufacture of further gloves.

What is claimed is:
1. A method of continuously moulding surgical rubber gloves, said method comprising the steps of providing a bath of concentrated coagulant, successively immersing a series of formers each having the shape of said glove in the bath of concentrated coagulant to a depth not less than the required length of the glove, successively removing the formers of the series from the concentrated coagulant bath, allowing said coagulant on each of the formers to at least partially dry, providing a washing bath containing a solvent for the coagulant, successively washing substantially all of the concentrated coagulant from each of the formers of the series except in the area on which the wrist portion of the glove is to be moulded by successively immersing the formers of the series in the washing bath to a depth less than the length of said glove, replenishing the solvent in said washing bath for maintaining the concentration of coagulant substantially constant and at a low value, successively removing the formers of the series from the washing bath, providing a dilute coagulant bath, then successively immersing the formers of the series in the dilute coagulant to a depth not less than the depth to which it is immersed in the solvent, successively removing the formers of the series from the dilute coagulant, allowing the coagulant to at least partially dry, and applying latex to the coagulant-coated area of the formers to provide a glove having relatively thin-walled palm and finger sections and a relatively thick wrist band.

References Cited

UNITED STATES PATENTS

| | | | |
|---|---|---|---|
| 2,097,528 | 11/1937 | Morton | 264—307 X |
| 2,806,257 | 9/1957 | Rosenberg | 264—307 X |

FOREIGN PATENTS

| | | |
|---|---|---|
| 624,547 | 7/1961 | Canada. |

ROBERT F. WHITE, *Primary Examiner.*

N. RUSHEFSKY, *Assistant Examiner.*